No. 724,037. PATENTED MAR. 31, 1903.
W. L. PARTINGTON.
PIPE CLAMP.
APPLICATION FILED JAN. 3, 1903.
NO MODEL.

Witnesses:
A. McArthur
H. C. Rodgers

Inventor:
W. L. Partington.
By George J. Thorpe
Atty.

UNITED STATES PATENT OFFICE.

WILLIAM LEES PARTINGTON, OF KANSAS CITY, MISSOURI, ASSIGNOR OF ONE-FOURTH TO A. W. McALISTER, OF KANSAS CITY, MISSOURI.

PIPE-CLAMP.

SPECIFICATION forming part of Letters Patent No. 724,037, dated March 31, 1903.

Application filed January 3, 1903. Serial No. 137,744. (No model.)

*To all whom it may concern:*

Be it known that I, WILLIAM LEES PARTINGTON, a citizen of the United States, residing at Kansas City, in the county of Jackson and State of Missouri, have invented certain new and useful Improvements in Pipe-Clamps, of which the following is a specification.

My invention relates to pipe-clamps, and more especially to a device to be disposed within a length of pipe coincidental with the overlapping end of the contiguous length; and my object is to produce a clamp which can be secured in position easily and quickly without the use of tools and which will reliably hold the "lengths" rigidly together without the use of wire or equivalent external braces or suspension devices.

Figure 1:
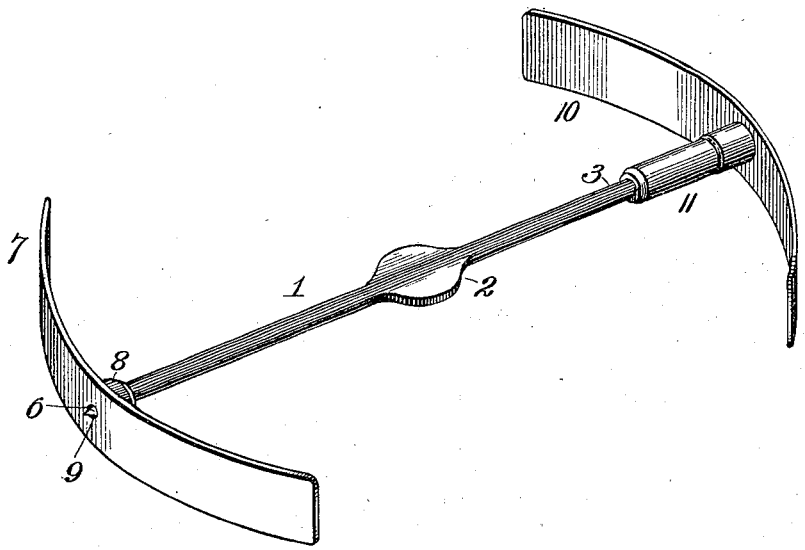
Figure 2:
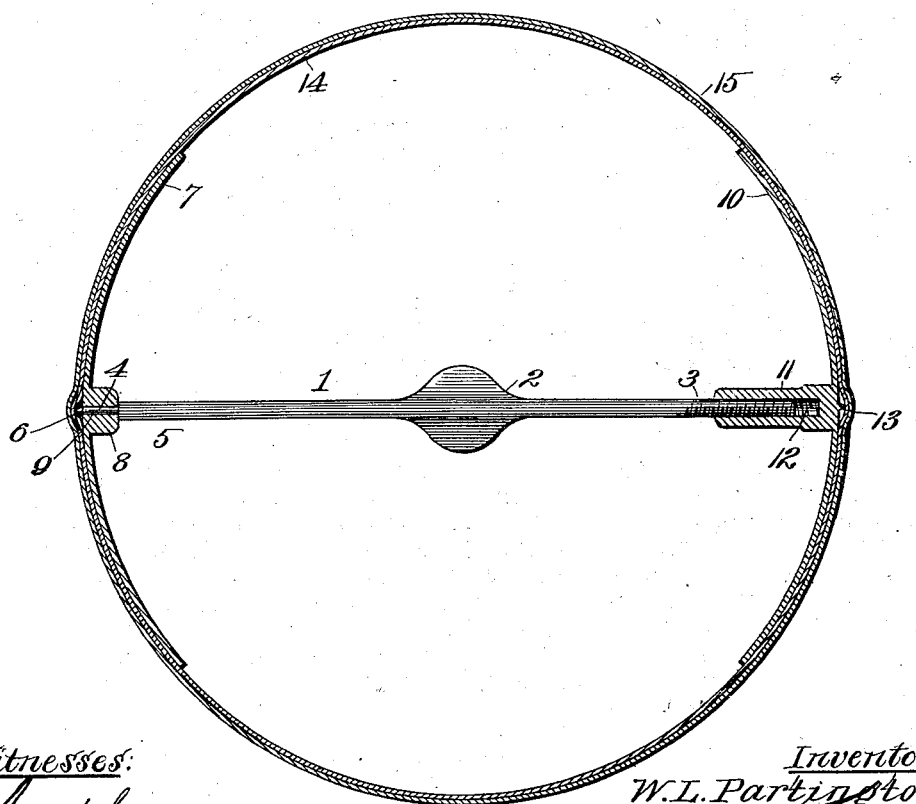

To this end the invention consists in certain novel and peculiar features of construction and combinations of parts, as hereinafter described and claimed, and in order that it may be fully understood reference is to be had to the accompanying drawings, in which—
Figure 1 is a perspective view of a pipe-clamp embodying my invention. Fig. 2 is a cross-section of the overlapping ends of contiguous pipe lengths as clamped together by my improved clamp, the latter being shown partly in elevation and partly in section.

In the said drawings, 1 designates a rod formed with thumb-wings 2 at its center whereby it may be readily grasped between one's thumb and finger and turned. At one end the rod is threaded, as at 3, and at the other reduced to form an axial pin 4, a shoulder 5, near the inner end of said pin, and an indentation-point 6 at its outer end.

7 designates a segmental plate of any suitable length and constructed of elastic or non-elastic material and provided at its inner side with a central hub 8, having a bore or passage 9. 10 designates a similar plate, forming an arc of a circle of the same size and provided at its inner end with a hub 11, having an axial threaded socket 12, and projecting outward from the plate in alinement with said socket is an indentation-point 13.

To assemble the parts together, the reduced and pointed portion 4 of the rod is inserted through the passage 9 of the plate-hub 8, and the other plate is screwed upon the opposite end of the rod until the clamp as a whole is of slightly-smaller diameter than the pipe into which it is to be fitted, as shown. The operator now introduces the clamp within the length of pipe, as at 14, which is adapted to be fitted in the contiguous one, and turns rod 1, the result being the diameter of the clamp is increased, and the indentation-points 6 and 13 slightly indent the pipe length, the indentations being sufficient to hold the clamp reliably in such position until the length, as at 15, is fitted over the first-named length in the customary manner. The operator then slips his arm down through one of the lengths, and, grasping the handle portion 2 of the clamp, manipulates the rod to still further increase the diameter of the clamp, and thus by pressing the inner length outwardly against the outer one secures the two pipe lengths as rigidly together as though they were integrally constructed.

In Fig. 2 the indentations of the pipe lengths through the medium of the points 6 and 13 are exaggerated somewhat, so as to bring out the effect obtained more clearly.

In practice it is obvious that the connection of the pipe length with the stove is not provided with a clamp and that in taking down the pipe for cleaning or other purposes the joint must be first broken at that point, so as to enable the operator to introduce his arm into the pipe lengths as successively presented for the purpose of grasping the clamp-handles 2 and turning them to reduce the diameters of the clamps preliminary to their removal and the subsequent disconnection of the pipe lengths, as will be readily understood.

Where the plates 7 and 10 are of spring metal, it is obvious that they will adapt themselves to the configuration of the pipe-sections to which they are applied. Said plates, however, may be of cast metal, and if so should form arcs of circles of the same size as the pipe lengths which they are to secure together, and thus obtain a more extended bearing on the latter, as will be readily understood.

From the above description it will be apparent that I have produced a clamp for stove and analogous pipes which possesses the features of advantage enumerated as desirable in the statement of invention and which may be obviously modified in minor particulars without departing from the principle and scope or sacrificing any of its advantages.

It will be understood, of course, that it may be unnecessary to employ a clamp in any other point than at the point of connection of the topmost length with the flue, as at that point there is more danger of dislocation than at any other.

Having thus described the invention, what I claim as new, and desire to secure by Letters Patent, is—

1. A pipe-clamp, comprising a pair of opposite segmental plates, a diametric rod connected to and having a threaded relation with at least one of them, and indentation-points at the outer sides of the plates.

2. A pipe-clamp, comprising a pair of opposite segmental plates, a diametric rod connected to and having a threaded relation with at least one of them, and indentation-points at the outer sides of the plates, one of them being integral with the plate and the other with said rod.

3. A pipe-clamp, comprising a pair of opposite segmental plates, one of them having a hub with a passage, and the other a threaded socket, and an external indentation-point; and a rod having a threaded end engaging said threaded socket and a reduced portion at its opposite end projecting through the passage of the other plate, and terminating in an indentation-point externally of the last-named plate.

4. The combination with a pair of pipe lengths having the end of one of them overlapping that of the other, with an internal clamp, consisting of a pair of segmental plates fitting against the inner sides of the inner pipe length, a diametric rod connecting said plates and having a threaded relation with at least one of them, and indentation-points at the outer sides of said plates.

In testimony whereof I affix my signature in the presence of two witnesses.

WILLIAM LEES PARTINGTON.

Witnesses:
H. C. RODGERS,
G. Y. THORPE.